United States Patent
Burkart et al.

(10) Patent No.: US 10,352,752 B2
(45) Date of Patent: Jul. 16, 2019

(54) HYBRID CONNECTION DEVICE

(71) Applicant: STRATEC Biomedical AG, Birkenfeld (DE)

(72) Inventors: Michael Burkart, Walbronn (DE); Martin Trump, Pforzheim (DE)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 14/529,953

(22) Filed: Oct. 31, 2014

(65) Prior Publication Data

US 2015/0123809 A1    May 7, 2015

(30) Foreign Application Priority Data

Nov. 1, 2013   (GB) .................................. 1319323.0

(51) Int. Cl.
    *G08B 23/00*     (2006.01)
    *G01F 23/00*     (2006.01)
    *H04Q 9/14*      (2006.01)
    *H04B 5/00*      (2006.01)

(52) U.S. Cl.
    CPC ...... *G01F 23/0069* (2013.01); *G01F 23/0084* (2013.01); *H04Q 9/14* (2013.01); *H04B 5/0031* (2013.01); *H04B 5/0081* (2013.01)

(58) Field of Classification Search
    CPC ... G01F 23/0069; G01F 23/0084; H04Q 9/14; H04B 5/0031; H04B 5/0081
    USPC ..................................... 340/870.02, 620–627
    See application file for complete search history.

(56) References Cited

U.S. PATENT DOCUMENTS

| | | | | |
|---|---|---|---|---|
| 4,125,021 A | * | 11/1978 | Kamei | G01F 23/26 336/75 |
| 4,753,353 A | * | 6/1988 | Kramer | B07C 5/344 209/570 |
| 6,056,154 A | * | 5/2000 | Fowler | B67D 3/00 222/1 |
| 6,230,558 B1 | * | 5/2001 | Miwa | B60K 15/04 73/114.39 |
| 6,335,690 B1 | * | 1/2002 | Konchin | G01D 5/2073 340/450 |
| 6,546,795 B1 | * | 4/2003 | Dietz | G01F 23/266 324/657 |
| 6,549,098 B1 | * | 4/2003 | Bernard | H03H 1/0007 333/181 |

(Continued)

FOREIGN PATENT DOCUMENTS

GB        2485832        5/2012

*Primary Examiner* — Kerri L McNally
*Assistant Examiner* — Thang D Tran
(74) *Attorney, Agent, or Firm* — 24IP Law Group USA, PLLC; Timothy R DeWitt

(57) ABSTRACT

A connection device for providing both a connection for liquid transport and a connection for the transport of electrical energy is disclosed. The connection device comprises a first part and a second part, which detachably connect to one another such that a first liquid conduit comprised in the first part connects with a second liquid conduit comprised in the second part, and a primary coil comprised in the first part inductively couples to a secondary coil comprised in the second part, wherein the first part further comprises a first electronic circuit electrically connected to the primary coil, and the second part further comprises a second electronic circuit electrically connected to the secondary coil.

15 Claims, 6 Drawing Sheets

(56) References Cited

U.S. PATENT DOCUMENTS

| | | | | |
|---|---|---|---|---|
| 2003/0080097 A1* | 5/2003 | Boulos | ............... | H05H 1/30 219/121.49 |
| 2004/0094227 A1* | 5/2004 | Few | ............... | B60S 5/00 141/98 |
| 2004/0226296 A1* | 11/2004 | Hanna | ............... | F01K 17/02 60/671 |
| 2005/0001058 A1* | 1/2005 | Shank | ............... | B05B 9/002 239/284.1 |
| 2006/0123902 A1* | 6/2006 | Pechtold | ............... | F17C 13/021 73/304 C |
| 2006/0125484 A1* | 6/2006 | Wittmer | ............... | G01N 27/4035 324/438 |
| 2006/0260798 A1 | 11/2006 | Hall et al. | | |
| 2007/0194948 A1 | 8/2007 | Hall et al. | | |
| 2007/0284457 A1* | 12/2007 | Shank | ............... | B05B 9/002 239/135 |
| 2008/0012569 A1 | 1/2008 | Hall et al. | | |
| 2008/0236685 A1* | 10/2008 | Nourdine | ............... | B60K 15/04 137/599.18 |
| 2009/0021106 A1* | 1/2009 | Baughman | ............... | F03G 7/005 310/300 |
| 2009/0151926 A1 | 6/2009 | Hall et al. | | |
| 2009/0183778 A1* | 7/2009 | Wildegger | ............... | B60S 1/487 137/13 |
| 2009/0216292 A1* | 8/2009 | Pless | ............... | A61N 1/3785 607/33 |
| 2010/0049210 A1* | 2/2010 | Boone, III | ............... | A61B 17/545 606/131 |
| 2010/0084488 A1* | 4/2010 | Mahoney | ............... | H01L 41/042 239/102.2 |
| 2012/0059349 A1* | 3/2012 | Kuo | ............... | A61M 5/1407 604/500 |
| 2012/0149789 A1* | 6/2012 | Greenbaum | ............... | C01B 13/0207 518/704 |
| 2012/0293023 A1* | 11/2012 | Harris | ............... | H01P 1/19 310/26 |
| 2013/0234899 A1* | 9/2013 | Pope | ............... | H01Q 1/243 343/702 |
| 2013/0329333 A1* | 12/2013 | Minteer | ............... | B64D 45/02 361/218 |
| 2014/0036464 A1* | 2/2014 | Kilger | ............... | H01L 23/49822 361/767 |
| 2014/0116131 A1* | 5/2014 | Forgue | ............... | G01F 23/38 73/313 |
| 2014/0305194 A1* | 10/2014 | Surman | ............... | G01F 23/26 73/61.44 |
| 2015/0250028 A1* | 9/2015 | Duffield | ............... | A01M 1/2061 219/628 |
| 2015/0303561 A1* | 10/2015 | Yang | ............... | H01Q 1/2266 343/842 |

\* cited by examiner

HYBRID CONNECTION DEVICE

CROSS-REFERENCE TO RELATED APPLICATIONS

The present application claims priority to British Patent Application No. GB 1319323.0 filed on Nov. 1, 2013. The aforementioned application is hereby incorporated by reference in its entirety.

BACKGROUND OF THE INVENTION

Field of the Invention

The invention relates to a connection device for providing both a connection for transport of a liquid and of electrical power without the use of electrical contacts.

Brief Description of the Related Art

Sensing or measuring the presence or a property of a liquid, e.g. liquid level detection or the measurement of a concentration of an electrolyte, is an exercise widespread in laboratories, clinics, or biotech industry. For example, clinical diagnostic devices often handle liquids, in which case means for the measuring of the presence of the property of the liquid are needed. The presence of a liquid can, for example, be measured by monitoring the signal from a sensor. The signal from the sensor may change according to whether the sensor is in contact with a liquid or not. Other sensors may comprise a moveable sensing element, wherein the signal from the sensor may depend on a position of the sensing element.

Sensing a property of a liquid requires the sensing element of the sensor, e.g. an electrode or a floating element, to come into contact with the liquid. The contact of the sensing element with the liquid generates an electrical signal encoding a sensing value. Evaluation means receive and process the electrical signal and output an outcome of the sensing, e.g. a measurement value or an indication of the presence of the liquid.

Sensors sensing a property of a liquid need to unite in a single device liquid contacts for contacting the liquid and an electrical connection portion for supplying electrical power from a source of electrical power to the sensor. Furthermore, the liquid contacts need to be operatively, e.g. electrically, connected to an electrical sensing circuit for transmission of the sensing value to the evaluation means.

Thus, designing sensors sensing the presence or a property of a liquid is a challenge. The electrical circuit of the sensor for generating the sensing value has to be protected from the liquid in order to avoid corrosion or short circuits.

In the case of liquid level detection, such sensors monitor a filling of a liquid into a container or detect the level of the liquid in the container. The sensing may occur in parallel to the filling of the container. The container is filled using a liquid supply part, for example a pipe or a tubing. Conveniently, a sensor is attached to, disposed at, or integrated into an end portion of the liquid supply part.

The end portion of the liquid supply part may be detachably connected to a supply portion of the liquid supply part. In this case, the detachable end portion of the liquid supply part and the sensor may form a single device. The said single device has to provide for both an electrical connection portion for supplying the sensor with electrical power and a liquid connection portion for supplying liquid to the end portion of the liquid supply part.

In use, the liquid connection portion and the electrical connection portion either establish a liquid and an electrical connection in a substantially simultaneous manner, e.g. by connecting to a hybrid supply, or the liquid connection portion and electrical connection portion are connected consecutively for providing the liquid and the electrical connection.

In the first case of a substantially simultaneous providing of the connections, a damaged liquid supply or a leaking liquid connection can cause liquid to come into contact with the electrical contacts, thus potentially causing a short circuit, which can ruin the electronics in the electrical sensing circuit.

In the second case of a consecutive providing of the connections, when there is an electrical connection, an operator needs to remember to connect the liquid connection portion to the supply portion of the liquid supply part in order to guide the liquid through the end portion of the liquid supply part to the container. Failure of doing so can result in failure of the sensor sensing the presence or a property of the liquid, which can lead flooding devices and possibly result in damaging and/or contamination of the devices. In the case of clinical diagnostic analyses, such contamination can be a risk not only for the operator, but also for the patient. Furthermore, damaged devices may have to be replaced at high costs.

SUMMARY OF THE INVENTION

It is an object of the invention to provide a connection device for providing both a connection for liquid transport and a connection for transport of electrical power, by detachably connecting a first part of the connection device and a second part of the connection device, wherein the connection for transport of electrical power is established without the use of electrical contacts.

A connection device for providing both a connection for liquid transport and a connection for the transport of electrical energy is disclosed. The connection device comprises a first part and a second part, which detachably connect to one another such that a first liquid conduit comprised in the first part connects with a second liquid conduit comprised in the second part, and a primary coil comprised in the first part inductively couples to a secondary coil comprised in the second part, wherein the first part further comprises a first electronic circuit electrically connected to the primary coil, and the second part further comprises a second electronic circuit electrically connected to the secondary coil.

The primary coil is a copper structure on at least one first PCB, and/or the secondary coil is a copper structure on at least a second PCB.

The primary coil is electrically connected to a source of electrical power.

The first part and the second part further are communicatively coupled.

A first ferrite layer is interposed between the primary coil and the first electronics, and/or a second ferrite layer is interposed between the secondary coil and the second electronics.

The first part may comprise a signal amplifier for amplifying signals from the second before transmitting them to a digital signal processor.

The second part may further comprise a sensing element electrically connected to the second electronic circuit.

The sensing element may comprise a pressure sensor, an electrochemical sensor, an optical sensor, or a level sensor.

A method for filling at least one liquid container with a predetermined one of a liquid (3). The method comprises the steps of providing a connection for liquid transport and an inductive connection for the transport of electrical energy by connecting a first part and a second part of a connection device, inserting the second part into the at least one liquid container, sensing a level of the predetermined one of the liquid within the at least one liquid container, transmitting signals pertaining to the level of the predetermined one of the liquid from the second part via the inductive connection to the first part, monitoring the level of the predetermined one of the liquid.

The transmitting of signals may comprise modulating a load of the second part and detecting the changes in current and/or voltage generated in the first part.

The modulating of the load may comprise pulse-width modulation.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE FIGURES

For a more complete understanding of the present invention and the advantages thereof, reference is now made to the following description and the accompanying drawings, in which.

DETAILED DESCRIPTION OF THE INVENTION

Figure 1:
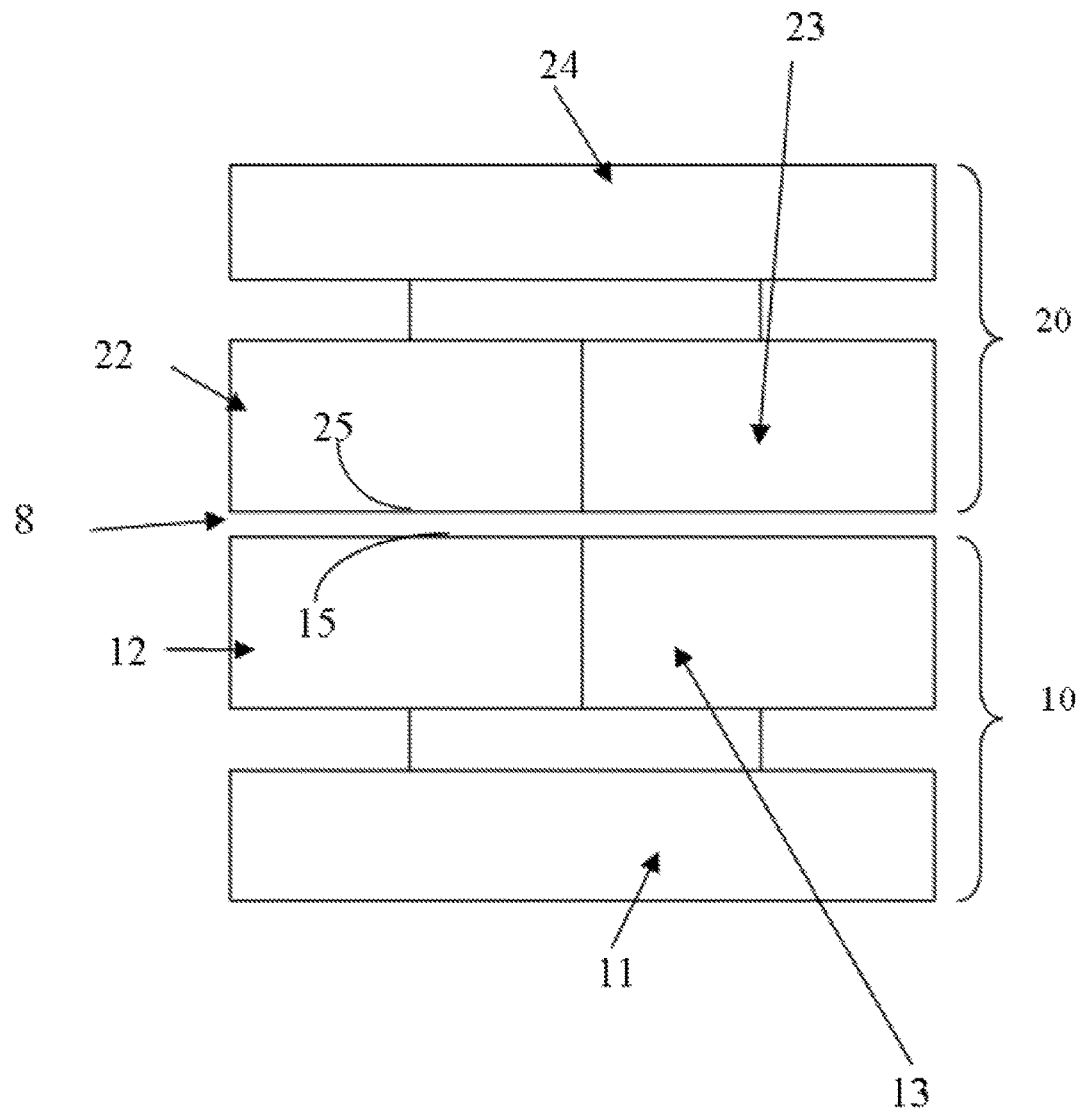
FIG. 1 diagrammatically shows a first part and a second part of a connection device according to the invention.

The problem is solved by the features as contained in the independent claims, with advantageous embodiments being described by the features as contained in the independent claims.

Herein a connection device according to the invention is described. The connection device comprises a first part and a second part connectable to one another. The bringing into contact of the first part and the second part enables both a connection for liquid transport and a connection for transport of electrical power. The transport of electrical power may comprise transmission of signals.

Both the first part and the second part comprise a respective liquid conduit. The liquid conduit of the first part (in what follows "first liquid conduit") and the liquid conduit of the second part ("second liquid conduit") are connectable with one another. When connected, the first liquid conduit and the second liquid conduit provide the connection for liquid transport.

The first liquid conduit and the second liquid conduit may be connected to one another by connecting the first part and the second part of the connection device to one another. For example, but not limited thereto, the first liquid conduit and the second liquid conduit may be formed such that the first liquid conduit and the second liquid conduit connect to one another when connecting the first part and the second part to another.

The first liquid conduit and/or the second liquid conduit may further comprise a valve for blocking any liquid transport, the valves being in a blocking state when the first liquid conduit and the second liquid conduit are not connected with one another. The valve of the first liquid conduit and/or the valve of the second liquid conduit may be in an open, i.e. non-blocking, state upon connecting the first liquid conduit and the second liquid conduit with one another.

However, for safety reasons, the connecting of the first liquid conduit and the second liquid conduit may also require a further step in addition to the connecting of the first part and the second part. For example, but not limited thereto, the switching of the valve of the first liquid conduit and/or the valve of second liquid conduit from a blocking to an open, i.e. non-blocking, state may comprise a separate actuation in addition to the connecting of the first part and the second part.

The first part and the second part may further comprise means for coupling, such as, but not limited to, clamping or locking, the first part and the second part to one another. The first part and the second part may thus be held in contact with one another when the means for coupling is in a coupled state, such, as but not limited to, a clamped or a locked state.

In one aspect of the invention, the first part comprises a first connection surface and the second part comprises a second connection surface. The first connection surface and the second connection surface are formed such that the first connection surface and the second connection surface mate or partially mate when brought into contact with one another.

In this aspect, the first connection surface of the first part further comprises a first terminal portion of a first liquid conduit. The second connection surface of the second part further comprises a second terminal portion of a second liquid conduit. When the first part and the second part are brought into contact with one another, the first terminal portion of the first liquid conduit and the second terminal portion of the second liquid conduit join and connect with one another. The joining of the first terminal portion and the second terminal portion establishes the connection for liquid transport such that a liquid can flow between the first liquid conduit and the second liquid conduit. The joining of the first terminal portion and the second terminal portion further provides a liquid tight connection between the first liquid conduit and the second liquid conduit.

It is an advantage of the invention to provide a liquid tight connection between the first liquid conduit and the second liquid conduit. During liquid transport, the liquid tight connection prevents liquid of leaking out at the location where the first terminal portion and the second terminal portion join. Thus, during liquid transport there are no losses of the liquid transported. Furthermore, the liquid tight connection prevents unwanted contact of the liquid with parts and/or portions of the first part and/or second part or objects in the surroundings.

The first part further comprises a coil electrically connected to a source of electrical power and to a first electrical circuit. The first part may comprise a first electronic circuit. The second part further comprises a coil. In what follows, the coil of the first part will be termed "primary coil" and the coil of the second part "secondary coil". The secondary coil is electrically connected to a second electrical circuit. The second part may house the second electrical circuit completely or partially. The second electrical circuit may comprise a second electronic circuit.

When the first part and the second part are in contact with one another, the connection for transport of electrical power is provided by inductively coupling the primary coil and the secondary coil. When a first electrical current flows through the primary coil, the inductive coupling of the primary coil and the secondary coil provides for flow of a second electrical current in the secondary coil and the second electrical circuit electrically connected to the secondary coil. The transport of electrical energy from the primary coil to the secondary coil thus comprises conversion of electrical energy into energy of a magnetic field generated by the first electrical current in primary coil and inducing in the secondary coil the second electrical current.

The primary coil and/or the secondary coil may be a solenoid or helical coil, but is/are not restricted thereto. A first central axis of the primary coil may be oriented towards the first connection surface such that an inducing magnetic field, generated by the first current through the primary coil, extends across the first connection surface. Likewise, a second central axis of the secondary coil may be oriented towards the second connection surface such that the inducing magnetic field, generated in the primary coil, extends across the second connection surface and induces a second electrical current through the secondary coil, when the first part and the second part are in contact with one another. Thus, electrical power is supplied to the second electrical circuit electrically connected to the secondary coil.

It is an advantage of the present invention that the transport of electrical power between a source of electrical power and the second electrical circuit of the second part, electrically connected to the secondary coil, is provided by inductive coupling between the primary coil and the secondary coil. The inductive coupling enables transport of electrical power without having to rely on electrical contacts. Electrical contacts need to come into contact with one another in order to provide a connection for the transport of electrical power, e.g. a plug needs to be plugged into a socket. Such electrical contacts, when not in contact with one another for establishing a connection for the transport of electrical power, are accessible, for instance by liquids, along the same paths, along which the contacts may be brought into contact with one another for establishing a connection for the transport of electrical power. Thus, electrical contacts cause potential danger for users touching the contacts and are prone to corrosion and to causing short circuits when liquids contact the electrical contacts. Inductive coupling, however, provides a contactless way for the transport of electrical power. When using inductive coupling, neither do users risk touching electrical contacts nor are the electrical contacts prone to corrosion or to causing short circuits.

A further advantage of the present invention is that electrical power is transported to the second part, i.e. to the secondary coil and the second electrical circuit electrically connected to the secondary coil, without directly connecting the second part to a source of electrical power. Electrical power may thus be transported to the second part when the second part is in contact with a liquid, without risking a short circuit or harming a user.

In one aspect of the invention, the first part and the second part may further be communicatively connected for transmitting and receiving signals, when the first part and the second part are in contact with another. The second part may comprise a second signal transmitter or second transmitting means for transmitting signals into the surroundings of the second part, and the first part may comprise a first receiving means or first signal receiver for receiving signals from the surroundings of the first part. For example, but not limited thereto, the second signal transmitter or second transmitting means may be a transmitting antenna or a light source, and/or the first receiving means or first signal receiver may be a receiving antenna or a photodiode.

In the same aspect of the invention, the first part may comprise a digital signal processor for processing the signals received by the first signal receiver. The processed signals may be output to at least one of a controller, a memory, and a display.

In a further aspect of the invention, the first part may transmit signals to the second part. In this aspect, the first part comprises a first transmitting means or first signal transmitter, for example, but not limited thereto, a transmitting antenna or a light source, and the second part comprises a second receiving means or second signal receiver, for example, but not limited thereto, a receiving antenna or a photodiode.

In yet a further aspect, signals can be transmitted and received in both directions between the first part and the second part. Thus, the first part comprises a first signal transmitter or a first transmitting means as well as a first signal receiver or first receiving means. Furthermore, the second part comprises a second transmitting means or second signal transmitter as well as and second receiving means or second signal receiver. The first signal transmitter may be a transmitting antenna or a light source. The second signal transmitter may be a transmitting antenna or a light source. The first signal receiver may be a receiving antenna or a photodiode. The second signal receiver may be a receiving antenna or a photodiode.

Furthermore, the first part and second part may be communicatively coupled for transmitting and receiving signals using capacitive coupling. The first part may comprise a first terminal conductor of a coupling capacitor, and the second part may comprise a second terminal conductor of the coupling capacitor.

In one aspect of the invention, the first terminal conductor of the coupling capacitor may be the primary coil, and the second terminal conductor may be the secondary coil.

The second signal transmitter and the second signal receiver may furthermore be a single device. The single device both receives and transmits signals. For instance, by inductive coupling, the second may part may receive both energy and signals from the first part, and the second part may transmit signals to the first part. One possible way of transmitting signals to the first part by inductive coupling is by modulating the load of the second part. The first part may sense the modulating of the load of the second part by a change of a voltage or a current in the first part. This way of transmitting signals is also termed load modulation.

It is an advantage of the present invention that first part and the second part are communicatively coupled for transmitting signals between the first part and the second part in either direction. Thus, control signals and detection signals can be transmitted between the first part and the second part.

For example, but not limited thereto, the second part may measure a property of the surroundings of the second part and transmit the signal to the first part. The first part may subsequently process the signal and thereupon transmit a control signal to the second part controlling a state of the second part.

In the said aspect of the invention, both electrical power and signals are transported in a contactless manner. Thus, no electrical connection, by physical contact, between the first part and the second part is required, and still electrical power and signals to be electronically processed may be transported between the first part and the second part while at the same time providing a connection for liquid transport.

It is therefore an advantage of the present invention, that the user, by joining the first terminal portion of the first liquid conduit and the second terminal portion of the second liquid conduit, establishes both the connection for liquid transport and the connection for transport of electrical power. Thereby, errors by the user are reduced. If the user needs to establish both the connection for liquid transport and the connection for transport of electrical power, both by joining the first terminal portion and the second terminal portion and by bringing into contact respective electrical contacts of the first part and the second part, the user may make errors and forget to establish one of the two aforesaid connections. In case the user forgets to establish the connection for liquid transport, laboratory equipment may be flooded and destroyed by a liquid leaving the first liquid conduit via the first terminal portion.

The first part and second part according to the invention enable the substantially simultaneous transport of a liquid and of electrical power. Such substantially simultaneous transport can, for example, be useful in detecting liquid levels, when filling containers with liquid. The provided connection for liquid transport may be used to fill the container, and the provided connection for transport of electrical power may be used to transport electrical power to a liquid level sensing element or a level sensor comprised in the second part, electrically connected to the secondary coil in order to operate the liquid level sensing means or the level sensor. The second part may comprise sensing elements or sensors of other type, for example, but not limited to, a pressure sensor, an electrochemical sensor, an optical sensor.

The invention will be now described with reference to FIG. 1, which partially shows one illustrative aspect of the connection device (1) according to invention. In this aspect of the invention, the second part (10) is a sensor for sensing or measuring a presence or a property of a liquid (3) (see FIG. 2). In what follows, the term "sensor" is to be understood as meaning the second part (10), the sensor (10) being a particular embodiment of the second part (10).

In this aspect of the invention, the sensor (10) and the first part (20) are not electrically connected with one another, thereby increasing the usability and reliability of operation of the sensor (10), i.e. of the second part (10).

FIG. 1 schematically shows the sensor or the second part (10) and the first part (20), when brought into contact with one another. In this aspect, the bringing into contact occurs by joining the first connection surface (25) and the second connection surface (15). The sensor (10) may come into contact with a liquid (3) and generates a sensing signal pertaining to a property or the presence of the liquid (3). The first part (20) evaluates the sensing signal. When in contact with one another, the sensor (10) and the first part (20) constitute a single piece, which may easily be handled by a user, e.g. in a laboratory or for conducting experimental or diagnostic tests. The first part (20) and the sensor (10), when brought into contact with one another, provide a connection for liquid transport (shown in FIG. 2) and a connection for the transport of electrical energy.

When in contact with one another, the sensor (10) and the first part (20) may be partially separated by a gap (8). The gap (8) electrically insulates the first part (20) from the sensor (10), i.e. the second part (10). The gap (8) may comprise air and/or solid material, for instance made from plastic or resin. In this case, the first connection surface (25) and the second connection surface (15) connect and join in a way that the first connection surface (25) and the first connection surface (15) only partially touch one another, e.g., by so forming the first connection surface (25) and the second connection surface (15) that they are not completely planar.

As shown in FIG. 1, the sensor (10) comprises the secondary coil (12). The secondary coil (12) is inductively coupled to the primary coil (22), comprised in the first part (20), for generating electrical power in the secondary coil (12).

The sensor (10) further comprises a sensing element (11). The sensing element (11) forms part of the second electrical circuit electrically connected to the secondary coil (12). The sensing element (11) is adapted to come into contact with the liquid (3). Thereby, the sensing element (11) quantitatively or qualitatively senses the presence or a property of the liquid (3) and generates the sensing value pertaining to the presence or the property of the liquid (3).

The sensor (10) further comprises a signal transmitter (13) or transmitting means (13) for transmitting a signal pertaining to the sensing value. The signal transmitter (13) is comprised in the second electrical circuit and electrically connected to the sensing element (11). The signal transmitter (13) may also be electrically connected to the secondary coil (12).

The first part (20) comprises a signal receiver (23) or receiving means (23) for receiving a signal pertaining to the sensing value from the signal transmitter (13). In one aspect of the invention, the signal transmitter (13) is a transmitting antenna, and the signal receiver (23) is a receiving antenna. In another aspect of the invention, the signal transmitter (13) is a laser source, and the signal receiver (23) is a photodiode.

The first part (20) further comprises the first electrical circuit (not shown) comprising a first electronic circuit (24) for evaluating the signal pertaining to the sensing value and for controlling a voltage supplied to the primary coil (12).

The first electronic circuit (24) may be comprised in a PCB (printed circuit board). The first electronic circuit (24) is electrically connected to the signal receiver (23) for receiving the signal pertaining to the sensing value. The first electrical circuit may further comprise a signal processor (not shown) for processing the signal pertaining to the sensing value, the memory (not shown) for storing reference data and parameters pertaining to the sensor (10) and/or the liquid, and the controller (not shown). The first electrical circuit may further comprise the display for displaying the sensing value or an outcome of the processing of the sensing value. During the processing of the signal pertaining to the sensing value, the reference data and parameters, both stored in the memory, may be used for adjusting the sensing value. The result of the processing of the signal pertaining to the sensing value is output by the first electronic circuit (24). The result may be transmitted to the display (not shown), the memory, and/or other connected devices (not shown).

The first part (20) further comprises the primary coil (22). The primary coil (22) is electrically connected to the first electrical circuit. The primary coil (22) may be electrically connected to the controller for controlling a first voltage in the primary coil (22), e.g. the time course of the first voltage, and/or the first electrical current in the primary coil (22), e.g. the time course of the first electrical current.

Figure 2:
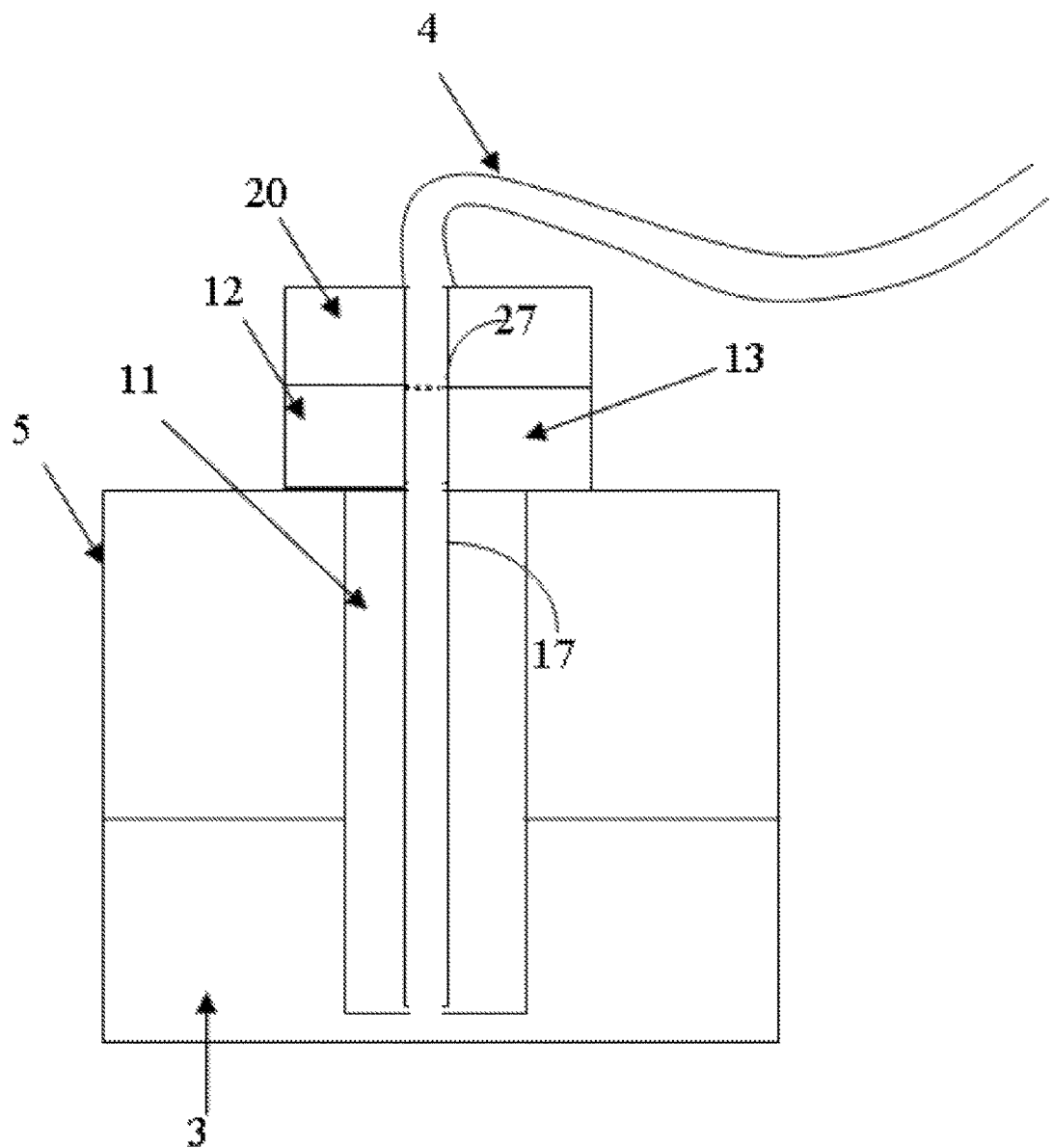
FIG. 2 shows an aspect of the connection device according to the invention, wherein the second part of the connection device comprises a sensing element in contact with a liquid and the first part of the connection device being connected to a liquid supply (not shown) by a tube.
Figure 6:
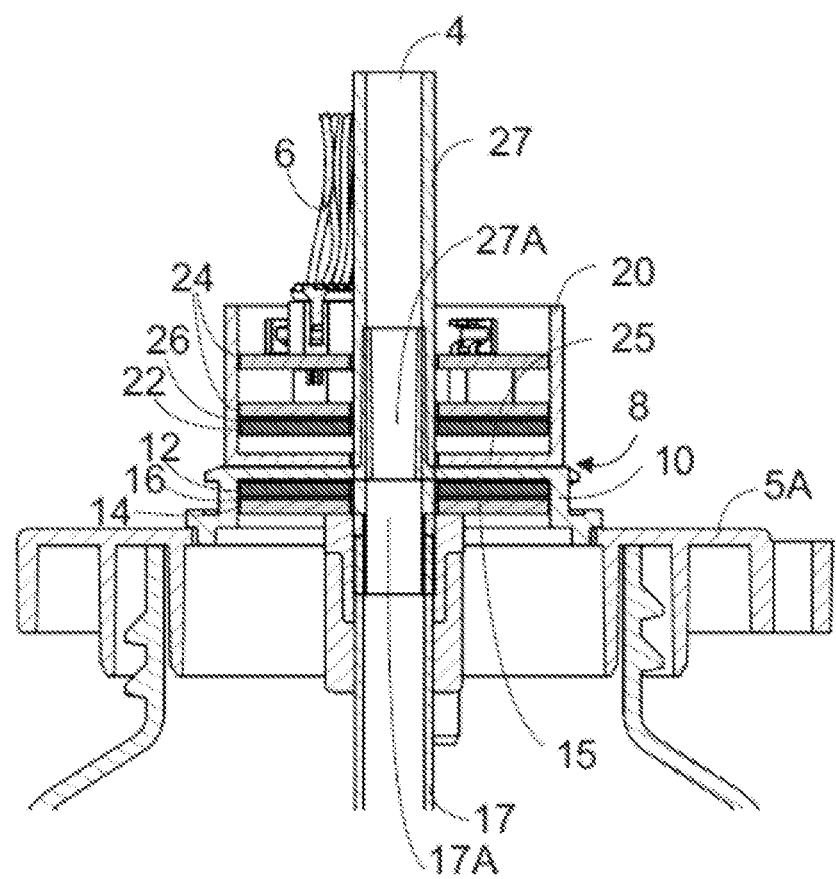
FIG. 6 shows a detail of FIG. 3.

FIG. 2 shows an aspect of the connection device (1) according to the invention, as operated by a user. The first part (20) and the sensor (10) are in contact with one another and thus constitute a user-operable instrument, e.g. for diagnostic or experimental purposes. The first liquid conduit (27) of the first part (20) is connected to a liquid supply (not shown) by a tube (4). The first terminal portion (see FIG. 6) of first liquid conduit (27) is joined with the second terminal portion (see FIG. 6) of the second liquid conduit (17) (as indicated by the dotted line in FIG. 2). The second liquid conduit (17) reaches down into a liquid container (5). By the joining of the first terminal portion and the second terminal portion and by the connecting of the first liquid conduit (27) to the tube (4) the connection of liquid transport is established. The connection for liquid transport allows the liquid (3) to be transported from the liquid supply into the container (5).

The primary coil and the first electrical circuit are also connected to an electrical power supply (not shown), e.g. by a cable (6) (see FIGS. 3 to 6), for supplying electrical energy to the primary coil (22) and the first electrical circuit. In one aspect of the invention, the tube (4) may further comprise the cable connected to the primary coil (22) and first electrical circuit.

The first part (20) is inductively coupled to the sensor (10) for transmitting electrical power across the air gap (8) to the sensor (10) by converting the electrical power carried by the first electrical current into energy of the inducing magnetic field and then back into electrical power carried by the second electrical current. The sensor (10) is in contact with the liquid (3) for sensing a sensing value. The liquid container (5) comprises the liquid (3). The sensor portion (10) is communicatively coupled to the first part (20) for transmitting the signal pertaining to the sensing value to the first part. The signal pertaining to the sensing value is processed in the signal processor of the first part (20). The result of the processing is transmitted to at least one of the display, the memory, and/or other connected devices (not shown).

FIGS. 3 to 6 show a further aspect of the connection device according to the invention. Features identical to those of the aspects of the connection device, described with reference to FIGS. 1 and 2, retain the same reference numerals. The following descriptions of features will apply, where applicable, in addition to the above descriptions of the same features with respect to FIGS. 1 and 2.

Figure 3:
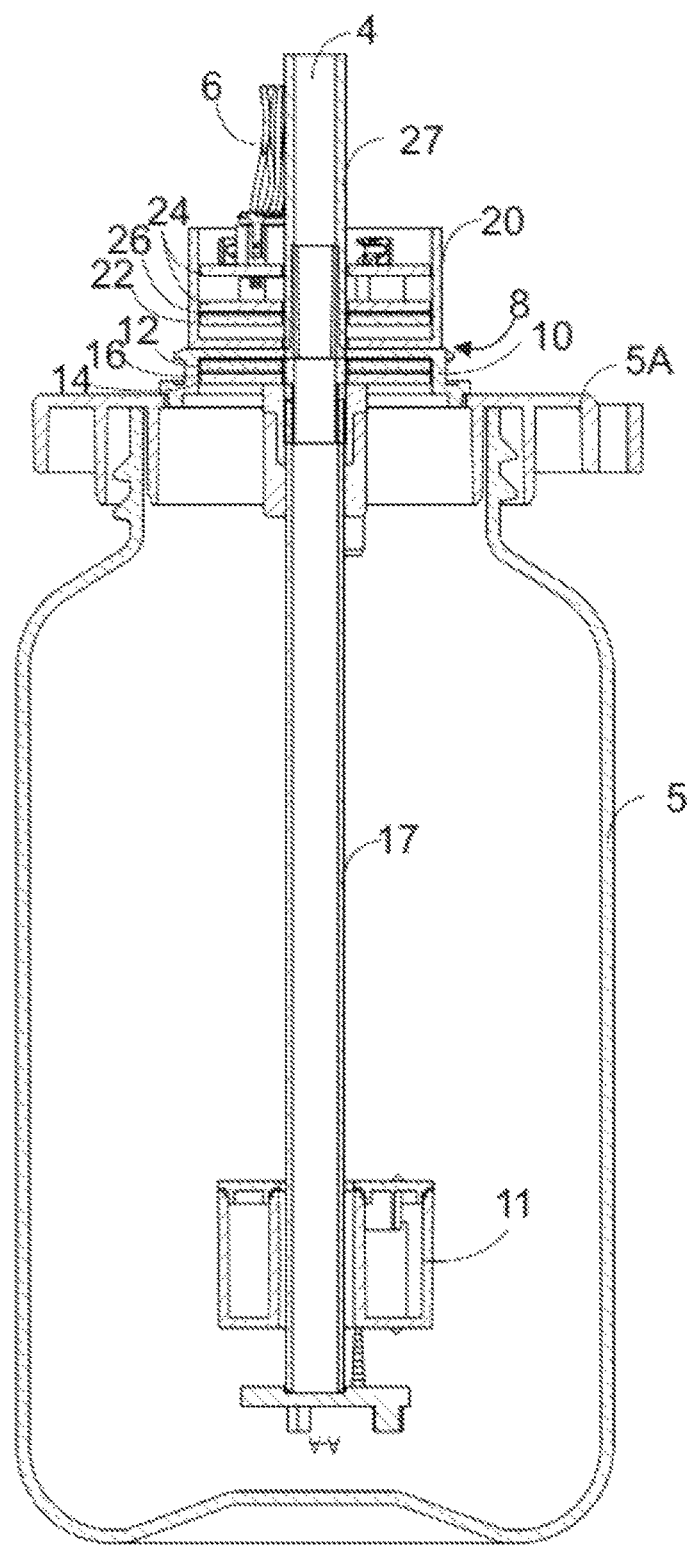
FIG. 3 shows a cross-sectional view of a further aspect of the connection device according to the invention, with the connection device inserted into and placed on top of a liquid container.
Figure 4:
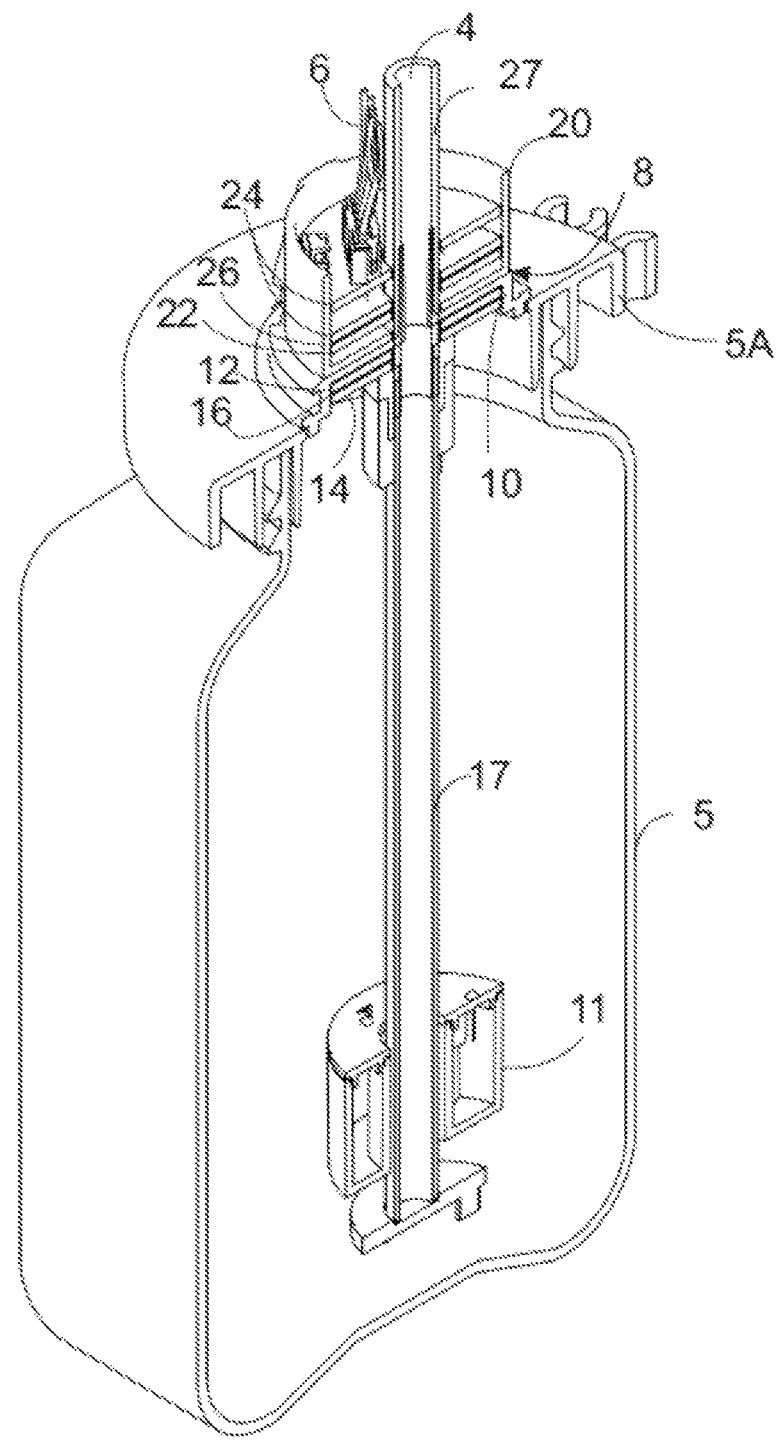
FIG. 4 is a perspective view of cross-sectional view of the aspect of the invention shown in FIG. 3.
Figure 5:
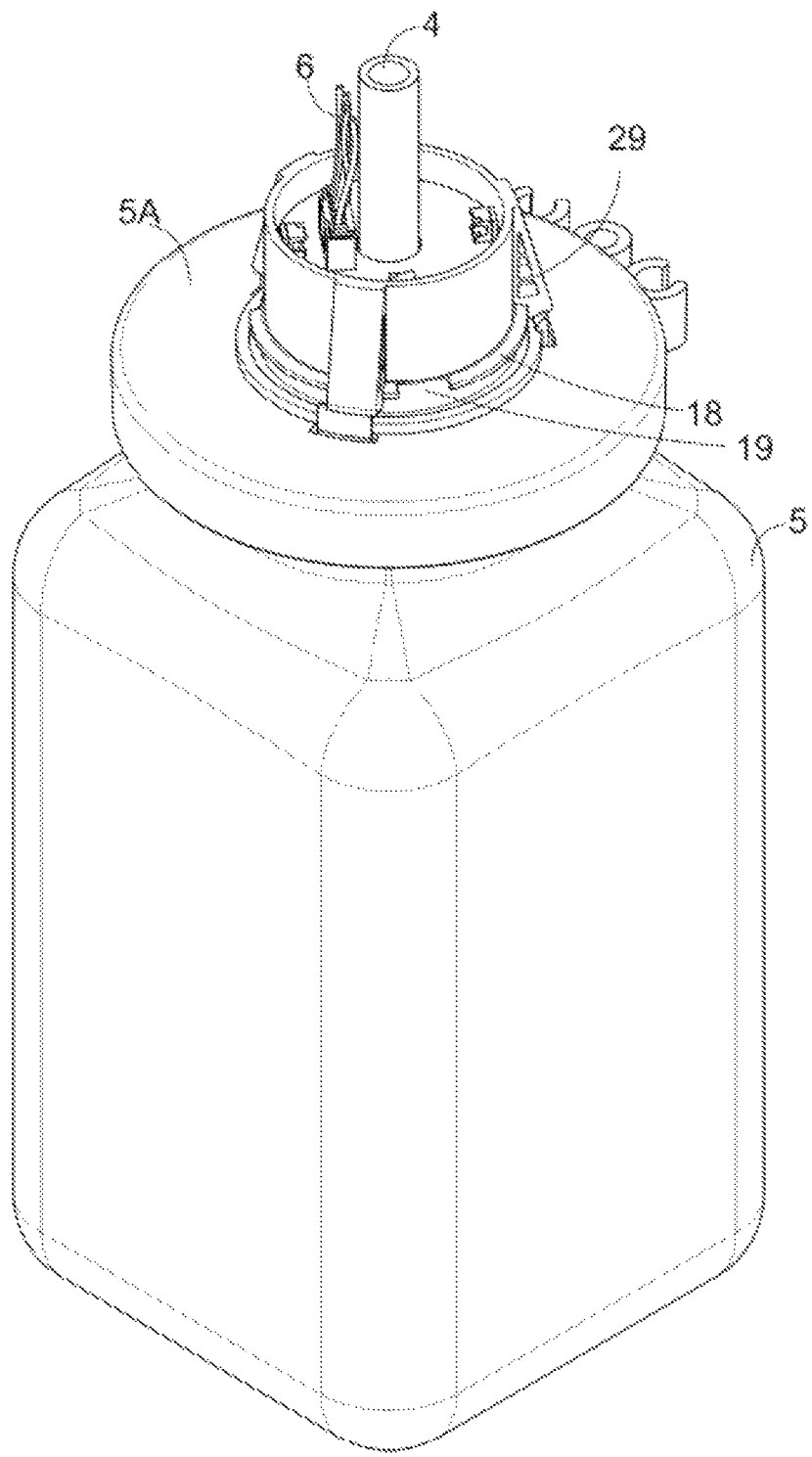
FIG. 5 shows a perspective view of the aspect of the invention, shown in FIGS. 3 and 4, as perceived by a user.

FIG. 3 shows the second part (10) (also referred to as the sensor (10)) and the first part (20), when brought into contact with one another and inserted into the liquid container (5). In the case shown in FIGS. 3 to 6, the connection device (1) is inserted into a lid (5A) placed on top of the liquid container (5).

The bringing into contact occurs by joining the first connection surface (25) and the second connection surface (15) (see FIG. 6), such that the first part (20) and the second part (10) form a single piece, which can be easily handled by a user. The first part (20) and the sensor (10), when brought into contact with one another, provide a connection for liquid transport via the first liquid conduit (27) and the second liquid conduit (17), and a connection for the inductive transport of energy between the primary coil (22) and the secondary coil (12). The gap (8) separates the primary coil (22) and the secondary coil (12).

The first terminal portion (27A) (see FIG. 6) of first liquid conduit (27) is joined with the second terminal portion (17A) (see FIG. 6) of the second liquid conduit (17). The second liquid conduit (17) reaches down into a liquid container (5). The connection for liquid transport allows the liquid (3) to be transported from the liquid supply through the tube (4) into the container (5).

The primary coil (22) is a copper structure printed on at least one first PCB (printed circuit board). The primary coil may, for instance, be a planar spiral coil inductor, formed of one or several layers of copper. Copper structures printed onto PCBs, such as planar spiral coil inductors, are cheaper to manufacture than wound coils.

The first electronic circuit (24) is comprised in the at least one first PCB. The first electronic circuit (24) controls power supply, for instance a supply voltage. The first electronic circuit (24) processes and generates analog signals. The at least one first PCB further comprises an oscillator (26) for feeding the primary coil (12) with power.

Several ones of the at least one first PCB are electrically connected by wiring. The several ones of the at least one first PCB may be stacked or arranged vertically with respect to one another.

The secondary coil (12) is a copper structure printed at least one second PCB (printed circuit board). The secondary coil may, for instance, be a planar spiral coil inductor, formed of one or several layers of copper. Copper structures printed onto PCBs, such as planar spiral coil inductors, are cheaper to manufacture than wound coils.

The second electronic circuit (14) is comprised in the at least one second PCB.

Several ones of the at least one second PCB are electrically connected by wiring. The several ones of the at least one second PCB may be stacked or arranged vertically with respect to one another.

A separate one of the at least one first PCB may comprise the primary coil (22). The separate one of the at least one first PCB may be placed closest towards the first connection surface (25) (see FIG. 6), as compared other ones of the at least one first PCB comprising the first electronic circuit (24). A ferrite layer (26) may be interposed in between the separate one and the other ones of the at least one first PCB. The ferrite layer (26) shields the electromagnetic field of the primary coil (22) towards the first electronic circuit (24), and enhances the electromagnetic field towards the first connection surface (25).

A separate one of the at least one second PCB may comprise the secondary coil (12). The separate one of the at least one second PCB may be placed closest towards the second connection surface (15) (see FIG. 6), as compared other ones of the at least one second PCB comprising the second electronic circuit (14). A ferrite layer (16) may be interposed in between the separate one and the other ones of the at least one second PCB. The ferrite layer (16) shields the electromagnetic field of the secondary coil (12) towards the first electronic circuit (14), and enhances the electromagnetic field towards the first connection surface (15).

The second part (10) transmits signals to the first part (20), using the inductive coupling, by modulating a load of the secondary coil (12) or a load electrically connected to secondary coil (12). The signals pertain to values sensed by the sensing element (11). Modulating the load results in a change of a resistance or an impedance, which in turn results in a change of a voltage and/or a current, generated in the primary coil (12). The change in voltage and/or current in the primary coil (12) may be detected and monitored, for instance by the controller (not shown) and/or the digital signal processor (not shown), comprised in the first electrical circuit of the first part (20). The signal to be transmitted is encoded by pulse-width modulation (PWM). Thus, PWM is applied to the load modulation for transmitting signals.

The sensing element (11) is adapted to come into contact with the liquid (3). Thereby, the sensing element (11) quantitatively or qualitatively senses the presence or a property of the liquid (3) and generates the sensing value pertaining to the presence or the property of the liquid (3). In the aspect shown in FIGS. 3 to 6, the sensing element (11) is a float for floating at the surface of the liquid (3) in the liquid container (5). The sensing element (11) may sense or detect a presence or absence of the liquid (3) as well as a filling level of the liquid (3) within the liquid container (5).

The signals transmitted from the second part (10) to the first part (20) may pertain to the presence or absence of the liquid (3). The signals may further pertain the filling level of the liquid (3) within the liquid container (5). The first part (20) receives the signals by detecting the changes in current and/or voltage, as described above, and monitors the presence or absence of the liquid (3) as well as the level of the liquid (3).

Dependent on the detected level of the liquid (3) within the liquid container (5), the controller may control the liquid transport of the liquid (3). For instance, when a predetermined maximum level of the liquid (3) is detected, the controller stops or interrupts the transport of the liquid (3) into the liquid container (5). Likewise, when a predetermined minimum level of the liquid (3) is detected, the controller starts or restarts the transport of the liquid (3) into the liquid container (5).

Thereby, the connection device (1) enables preventing overfilling of the liquid container (5). The connection device (1) thus prevents flooding and possible damage of laboratory equipment.

The primary coil and the first electrical circuit are electrically connected to an electrical power supply (not shown) by a cable (6), for supplying electrical energy to the primary coil (22) and the first electrical circuit.

Several ones of the connection device (1), as shown in FIGS. 1 to 6, may be in use simultaneously, for instance in a laboratory. Any one of the several ones of the connection device (1) may operate at a particular preset PWM carrier frequency for transmitting signals from the second part (10) to the first part (20). When assembling the several ones of the connection device (1), a particular one of the first part (20) may check the PWM frequency of the second part (10) being joined with the particular one of the first part (20). In case the PWM frequency does not correspond to a predetermined PWM frequency, the controller comprised in the first electrical circuit (24) of the particular one of the first part (20) may indicate to the user the second part (10) being joined thereto is a wrong one. Thereby, misconnections and contamination of the liquid (3) and/or liquid container (5) may be prevented.

In the aspect of the connection device (1) shown in FIGS. 3 to 6, the first part (20) comprises locking means (29). The locking means (29) snap into recesses (19) of a rim (18) of the second part (10) for providing a bayonet-type of locking of the first part (20) to the second part (10).

The connection device (1) may further monitor locking of the first part (20) to the second part (10). In one aspect, at least one spring (not shown) comprised in one of or both the first part (20) and the second part (10) may bias the first part (20) and the second part (10) apart from one another. Proper locking of the first part (20) and the second part (10) to one another counteracts the biasing force of the at least one spring. When the first part (20) and the second part (10) are properly locked to one another, the first connection surface (25) and the second connection surface (15) are held in contact with one another.

In another aspect, the first part (20) may comprise a Hall sensor or a reed sensor (not shown). The second part (10) may comprise a magnet (not shown). The Hall sensor or reed sensor and the magnet are arranged to overlap and interact upon properly locking the first part (20) and the second part (10) to one another. By interacting, the Halls sensor or the reed sensor and the magnet generate a signal, which may indicated to the user that first part (20) and the second part (10) are properly locked.

Monitoring of the locking of the first part (20) and the second part (10) prevents misconnections of the first fluid conduit (27) and the second fluid conduit (17). Thereby, the monitoring prevents flooding of laboratory equipment.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A connection device for providing both a connection for liquid transport and a connection for the transport of electrical energy, the connection device comprising: a first part comprising: a first liquid conduit; a primary coil; a first electronic circuit electrically connected to the primary coil; and a first ferrite layer interposed between the primary coil and the first electronic circuit, wherein the first ferrite layer shields electromagnetic fields of the primary coil towards the first electronic circuit; and a second part detachably connected to the first part, the second part comprising: a second liquid conduit detachably connected to the first liquid conduit in the first part; a secondary coil inductively coupled to the primary coil when the first and second parts are connected; a second electronic circuit electrically connected to the secondary coil, said second electronic circuit comprising a sensing element come into contact with the liquid; and a second ferrite layer is interposed between the secondary coil and the second electronic circuit, wherein the second ferrite layer shields the electromagnetic fields of the secondary coil towards the second electronic circuit, wherein said second part is connected to a container for holding the liquid such that the secondary coil remains outside said container, said sensing element contacts the liquid inside said container, and said first part remains outside said container.

2. The connection device according to claim 1, wherein the primary coil is a copper structure on at least one first PCB, and/or the secondary coil is a copper structure on at least a second PCB.

3. The connection device according to claim 1, wherein the primary coil is electrically connected to a source of electrical power.

4. The connection device according to claim 1, wherein the first part and the second part further are communicatively coupled.

5. The connection device according to claim 4, wherein the first part comprises a signal amplifier for amplifying signals from the second part prior to transmitting them to a digital signal processor.

6. The connection device according to claim 1, wherein the sensing element comprises a pressure sensor, an electrochemical sensor, an optical sensor, or a level sensor.

7. The connection device according to claim 1, wherein the second electronic circuit further comprises a signal transmitter electrically connected to said sensing element and the first part further comprises a signal receiver for receiving a sensing value from the signal transmitter.

8. The connection device according to claim 7, wherein said signal transmitter is electrically connected to said secondary coil.

9. The connection device according to claim 7, wherein said signal transmitter is a transmitting antenna and said signal receiver is a receiving antenna.

10. The connection device according to claim 7, wherein said signal transmitter is a laser and said signal receiver is a photodiode.

11. A method for simultaneous liquid transport and inductive transport of energy, the method comprising the steps of:
connecting a first part and a second part of a connection device such that a first liquid conduit in the first part connects with a second liquid conduit in the second part, and a primary coil in the first part inductively couples to a secondary coil in the second part upon connection of first part and second part;
connecting said connection device to a container for holding the liquid, wherein said first part and said secondary coil in said second part remain outside of said container and a sensing element in said second part is in said container and contacts said liquid in said container;
transporting the liquid through said first conduit to said second conduit and through said second conduit into said container;
applying electrical energy to said primary coil;
sensing a property of liquid in said container and generating a sensing value pertaining to said property with said sensing element;
transmitting said sensing value to an electronic circuit in said first part; and
receiving said transmitted sensing value in said electronic circuit in said first part.

12. The method according to claim 11, wherein the transmitting of said sensing value comprises modulating a load connected to the secondary coil and wherein said receiving said transmitted sensing value comprises detecting changes in current and/or voltage generated in the first part.

13. The method according to claim 12, wherein the modulating of the load comprises pulse-width modulation.

14. The method according to claim 11, further comprising controlling the transporting of liquid into the container based upon the sensing value received in the first part.

15. A connection device for providing both a connection for liquid transport and a connection for the transport of electrical energy, comprising: a first part comprising: a first liquid conduit; a primary coil; and a first electronic circuit electrically connected to said primary coil; and a second part detachably connected to said first part, said second part comprising: a second liquid conduit; a secondary coil; and a second electronic circuit electrically connected to said secondary coil, said second electronic circuit comprising a sensing element come into contact with the liquid; wherein said second part is connected to a container for holding the liquid such that the secondary coil remains outside said container and said sensing element contacts the liquid inside said container; wherein said first liquid conduit connects with said second liquid conduit and said primary coil inductively couples to said secondary coil upon connection of first part and second part; and wherein a first ferrite layer is interposed between the primary coil and the first electronic circuit; and/or a second ferrite layer is interposed between the secondary coil and the second electronic circuit for shielding electromagnetic fields of the respective coil towards its electronic circuit.

* * * * *